3,149,235
PHOTOSENSITIVE RADIANT SPOT TRACKING SYSTEM
John R. Clark, Fort Wayne, Ind., assignor to International Telephone and Telegraph Corporation
Filed June 10, 1960, Ser. No. 35,154
7 Claims. (Cl. 250—203)

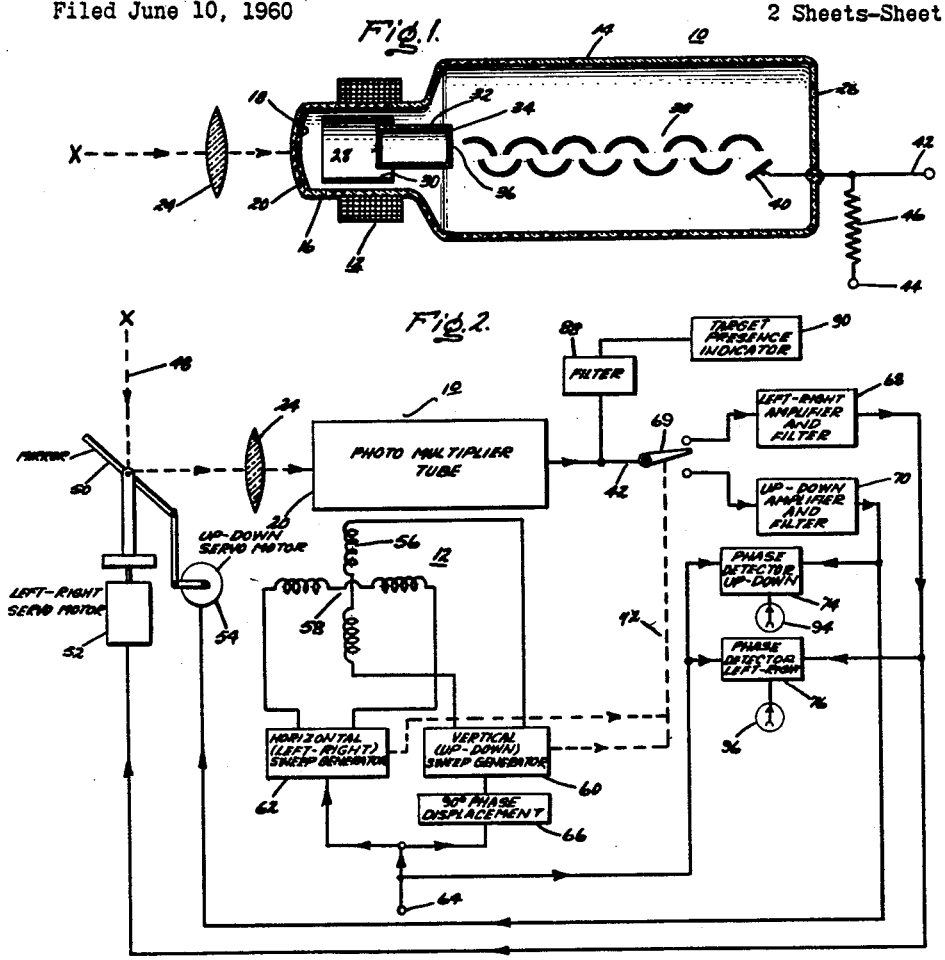

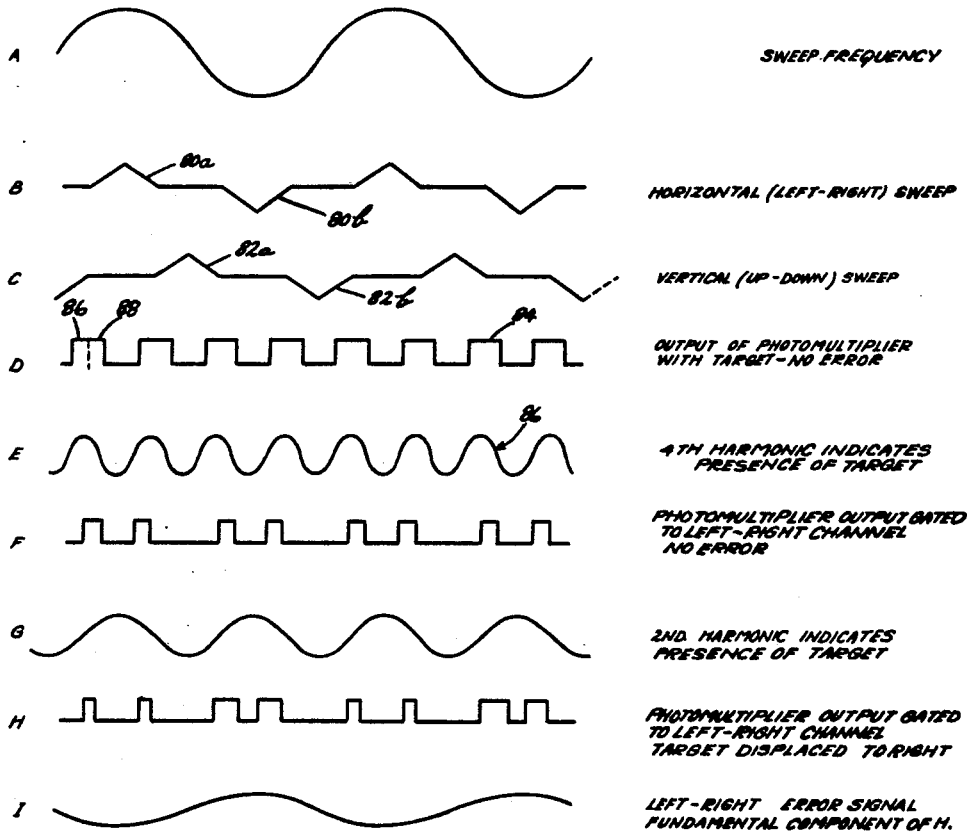
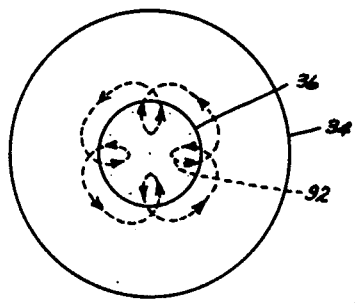

This invention relates to a system for tracking a radiant spot, such as a star, on a relatively darker background.

There are applications in the field of astronomy and celestial navigation where it is desirable to track a particular star. To the best of the present applicant's knowledge, prior electro-optical star tracking systems have employed either optical image splitting and balancing of the direct current output of multiple photocells, or mechanical chopping of the optical image as by rotation or nutation of a reticle and recovery of the signal from the ensuing modulation. Prior star tracking systems employing optical image splitting have involved problems of stability in the use of high gain direct coupled circuitry, and further have been excessively bulky due to the employment of four photomultiplier tubes. Systems employing chopping of the image are known to be subject to high noise level introduced by mechanical vibration and are also limited in the speed of response due to maximum practical mechanical speeds. It is therefore desirable to provide an improved system for tracking a radiant spot, such as a star, which does not involve the use of four photomultiplier tubes with the accompanying bulk, nor the use of the mechanical light-chopping arrangements of prior star tracking systems known to the present applicant.

It is accordingly an object of my invention to provide an improved system for tracking a radiant spot.

My invention, in its broader aspects, provides an image tube having a photocathode for producing an electron image in response to impingement of radiation thereon. The tube includes a masking electrode spaced from the photocathode and having a relatively small aperture therein and means for focusing the electron image in an electron image plane which includes the aperture. An anode is provided spaced from the masking electrode on the side thereof remote from the cathode for receiving electron flow which passes through the aperture and an output circuit is provided coupled to the anode for developing an output signal responsive to the electron flow. The image tube further includes means for deflecting the electron image between the photocathode and the masking electrode in two transverse directions. Sweep generator means are provided coupled to the beam deflecting means of the tube for scanning the electron image over the masking electrode in a geometric pattern with a substantial radial component whereby the image is caused to move into and out of the aperture to provide an output signal having a frequency component responsive to displacement of the image in its undeflected condition from the center of the aperture. Means are provided coupled to the output circuit of the tube and to the sweep generator means for separating the output signal into two orthogonal component signals. These two orthogonal component signals respectively have a fundamental frequency component the amplitude of which is proportional to the displacement of the image in its undeflected condition from the center of the aperture and thus can be employed as error signals in a servo system for moving the tube or some other part of the optical system so as to restore the radiant image and its resulting electron image to the center of the aperture in the masking electrode of the image tube.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a schematic cross-sectional view of the photomultiplier tube employed in the system of my invention;

FIG. 2 is a schematic diagram showing the system of my invention;

FIG. 3 shows one scanning pattern which may be employed in the system of my invention with the radiant spot being tracked and the resulting electron beam centered on the aperture in the masking electrode of the image tube;

FIG. 4 shows the same scanning pattern as FIG. 3, with the radiant spot and resulting electron beam displaced in one axis;

FIG. 5 is a diagram showing waveforms provided in the system of FIG. 2 employing the scanning pattern of FIGS. 3 and 4; and FIG. 6 shows another scanning pattern usable with my invention.

Referring now to FIG. 1, there is shown at 10 a photomultiplier tube suitable for use in the system of my invention. With the exception of the deflection yoke 12, image tube 10 may be of the type described and illustrated in Patent No. 2,796,547 issued June 18, 1957, to Scott Nevin and assigned to the assignee of the present application.

Tube 10 comprises an envelope 14 having a neck portion 16 with a suitable photocathode 18 formed on the inner surface of transparent face plate 20; photocathode 18 is sensitive to the desired portion of the radiation spectrum, such as infrared, near infrared, or visible light. It will be readily understood that radiant energy from remote point $x$ when focused upon transparent faceplate 20 by lens system 24 will cause the photocathode 18 to emit an electron beam toward the other end 26 of tube 10. An electron lens system 28 is provided spaced from photocathode 18 and comprising an outer sleeve electrode 30 and inner sleeve electrode 32. A masking electrode 34 closes the end of sleeve electrode 32 remote from photocathode 18 and has a small annular aperture 36 therein. Photocathode 18 and sleeve electrodes 30 and 32 are coupled to suitable sources of potential (not shown) so as to focus an electron image emitted by the photocathode 18 onto an image plane coincident with the masking electrodes 34 and aperture 36.

A multi-stage electron multiplier section 38 is provided on the side of masking electrode 34 remote from photocathode 18, electron multiplier section 38 terminating in anode 40; as is well known to those skilled in the art, any electrons which pass through aperture 36 in masking electrode 34 impinge upon the first stage of the electron multiplier section 38 which emits secondary electrons at a rate greater than unity, these electrons being multiplied in the same fashion by succeeding stages, and eventually being collected by the anode 40. Anode 40 is in turn connected to output circuit 42 and to suitable source 44 of positive potential by load resistor 46. It will be readily seen that only those electrons of electron beam from the photocathode 18 which pass through the aperture 36 of the masking electrode 34 will be utilized in producing an output circuit 42, all of the remaining electrons being intercepted by the masking electrode 34.

While in the photomultiplier tube of the aforesaid Patent No. 2,796,547, the entire electron image from photocathode 18 is focused onto masking electrode 34 with only a portion thereof passing through aperture 36, in accordance with my invention, I provide a deflection yoke 12 surrounding neck portion 16 of envelope 14 for deflecting the electron beam emitted from photocathode 18 in two transverse dimensions, i.e., in quadrature.

Referring now to FIG. 2, the optical image 48 from remote radiant spot $x$ may be directed onto transparent faceplate 20 of photomultiplier tube 10 by a movable mirror system 50 adapted to be rotated by "left-right" servo motor 52 and to be nodded in a vertical plane by "up-down" servo motor 54. Deflection yoke 12 of image tube 10 comprises vertical deflection coils 56 and horizontal deflection coils 58, as is well known to those skilled in the art. Vertical and horizontal deflection coils 56 and 58 are energized by vertical and horizontal sweep generators 60 and 62 to scan the electron beam from photocathode 18 over masking electrode 34 in a geometric pattern having a recognizable radial component. Such a scanning pattern, which may be referred to as "star shaped," is shown in FIG. 3, and is provided by vertical and horizontal sweep voltages generated by sweep generators 60 and 62 as shown in FIG. 5(C) and (B). Sweep generators 60 and 62 are energized from a common alternating current source 64 with a 90° phase displacement circuit 66 being coupled between source 64 and sweep generator 62.

Output circuit 42 from the photomultiplier tube 10 is alternately coupled by high speed switch 69 to "left-right" amplifier and filter circuit 68 and "up-down" amplifier and filter circuit 70. Switch 69 is coupled, as shown by dashed lines 72, for actuation responsive to sweep generators 60 and 62. "Left-right" amplifier and filter 68 is coupled to the "left-right" servo motor 52 for energizing the same, and "up-down" amplifier and filter 70 is coupled to the "up-down" servo motor 54 for energizing the same. Amplifier and filter circuits 68 and 70 may also be respectively coupled to source 64 by phase detectors 74 and 76.

Referring now to FIGS. 3 and 5, it will be seen that the 400 cycle sweep frequency shown in FIG. 5(A) is directly impressed upon horizontal (left-right) sweep generator 62 to provide the horizontal (left-right) sweep voltage shown in FIG. 5(B) which is impressed upon horizontal deflection coils 58, and that the 400 cycle sweep frequency shown in FIG. 5(A) is displaced by 90° and impressed upon vertical (up-down) generator 60 to generate the vertical (up-down) sweep voltage shown in FIG. 5(C) which is impressed upon the vertical deflection coil 56. Assuming now a dark field of view with a single radiant spot $x$, such as a star, at the geometric center, i.e., focused by means of mirror 50 and lens system 24 onto the center of photocathode 18 so that the resulting electron beam passes through the center of aperture 36, as at 78 in FIG. 3, the beam is now deflected by means of the horizontal sweep voltage 80a shown in FIG. 5(B) from point $a$ to point $b$ and back to point $c$ as shown in FIG. 3. It will thus be seen that the beam first traverses aperture 36 to the edge thereof and thereafter traverses the masking electrode 34 to point $b$, thus terminating the output signal from the photomultiplier tube 10 until the beam again reenters aperture 36 enroute to point $c$. In a similar manner, the beam is sequentially deflected from point $c$ to point $d$ and back to point $e$ by vertical deflection voltage 82a, from point $e$ to point $f$ and back to point $g$ by horizontal deflection voltage 80b, and finally from point $g$ to point $h$ and back to point $a$ by vertical deflection voltage 82b. The resulting output pulses 84 which appear in the output circuit 42 of photomultiplier tube 10 are shown in FIG. 5(D); since the center 78 of beam deflection under these conditions is at the geometric center of the aperture 36, it will be readily seen that the output pulses 84 are of uniform width, with a uniform repetition frequency. The pulses 84 which are obtained with no error, i.e., with the radiant spot being tracked appearing at the center of aperture 36, it will be seen to have a fourth harmonic component, as shown at 86 in FIG. 5(E). This component may be passed by a suitable band pass filter 88 coupled to output circuit 42 of tube 10 and to a target presence indicator 90. Thus, with a fourth harmonic signal 86 passed by filter 88, target presence indicator 90 will indicate that a target is present and within the field of view of aperture 36. It will be readily seen that if the radiant spot passes outside of aperture 36, i.e., on masking electrode 34, or if there is no target at all, the resulting output signal, if any, will not possess a fourth harmonic component 86 and thus target presence indicator 90 will indicate that there is no target within the field of view of aperture 36.

Coupling 72 of horizontal sweep generator 62 to switch 69 actuates switch 69 in response to horizontal sweep voltages 80 to connect output circuit 42 of tube 10 to "left-right" amplifier and filter circuit 68 when the output signal of photomultiplier tube 10 is in response to the horizontal sweep voltages 80. Likewise, vertical (up-down) sweep generator 60, through connection 72, actuates switch 69 in response to vertical sweep voltages 82 to connect output circuit 42 to "up-down" amplifier and filter 70 so that the output signal from tube 10, in response to the vertical sweep voltage 82, is impressed upon amplifier and filter 70. The result of this switching action is in essence to split or separate each output pulse 84 from multiplier tube 10 with portions 86 responsive to the vertical (up-down) sweep pulses 82 being impressed upon the "up-down" amplifier and filter 70 and portions 88, responsive to the horizontal (left-right) sweep voltages 80 being impressed upon the "left-right" amplifier and filter 68. Thus, pulses 88 impressed upon the "left-right" amplifier and filter 68 in the no error condition are shown in FIG. 5(F). It will be seen that the pulses 88, and the comparable pulses 86, in the "up-down" amplifier and filter channel 70, have such symmetry that they contain no energy at the fundamental scanning frequency shown in FIG. 5(A), however, they are seen to have a strong second harmonic as indicated in FIG. 5(G). This second harmonic may be employed rather than the fourth harmonic for target presence indication, and thus filter 88 could have been connected to the input circuit of either amplifier and filter channel 68 or amplifier and filter channel 70, being tuned to the second harmonic rather than the fourth harmonic.

Referring now additionally to FIG. 4, it is assumed that the undeflected electron beam responsive to the radiant spot is displaced along the "left-right" axis from the geometric center of aperture 36. The resulting pulse train in the left-right amplifier and filter channel 68 now lacks symmetry, having a longer "off" time during sweep to the right than to the left, as shown in FIG. 5(H). It will now be readily seen that the output pulses under these conditions in the "left-right" amplifier and filter channel 68 have a component at the fundamental scanning frequency, as shown in FIG. 5(I), the amplitude of this component being proportional to the amount of displacement of the undeflected electron beam from the geometric center of aperture 36 and the phase (polarity) with respect to the scanning frequency shown in FIG. 5(A) being indicative of the direction in which the image is off-center. With the image off-center to the right, as shown in FIG. 4, the fundamental component, as shown in FIG. 5(I), is 180° out of phase with the scanning frequency as shown in FIG. 5(A), whereas with the beam displaced to the left, the fundamental component of the signal in the left-right amplifier and filter channel 68 would be in phase with the scanning frequency.

The filter of the amplifier and filter channels 68 and 70 are respectively tuned to pass the fundamental scanning frequency and to attenuate all frequencies thereabove. The output signals form the left-right and up-down amplifier and filter channels 68 and 70 are thus in suitable form for direct application to the control windings of two phase servo motors 52 and 54. Thus, assuming again the conditions shown in FIG. 4 with the radiant image, and thus the electron beam, displaced only to the right, i.e., in the left-right axis, the resulting error signal at the fundamental scanning frequency from left-right amplifier and filter 68 will energize left-right servo motor 52 to rotate mirror 50 to restore the radiant image, and thus the electron beam, to the center of aperture 36, at which point the error signal provided by the left-right amplifier and filter 68 will disappear. It will be readily seen that simultaneous displacement of the radiant image and the electron beam in the vertical or up-down axis, will be accompanied by a simultaneous output signal from the up-down amplifier and filter channel 70 at the fundamental frequency, which will energize up-down servo motor 54 to move mirror 50 in the vertical plane, again to restore the image to the center of the aperture 36. It will thus be seen that amplifier and filter channels 68 and 70, together with servo motors 52 and 54 and mirror 50 form a closed loop servo with the photomultiplier tube 10. It will be readily apparent that the movement or positioning of mirror 50 in order to locate the radiant image at the center of aperture 36 indicates the direction to the remote radiant spot $x$. It will also be readily apparent that the photomultiplier tube and optical system 24 may themselves be servoed so that the photomultiplier tube and optical system 24 will continuously point directly at the remote radiant spot $x$.

Study of FIGS. 3, 4 and 5 will reveal that any scanning pattern which has a recognizable radial component can be employed in practicing my invention, and that switch 69 in essence resolves the output signal in output circuit 42 of photomultiplier tube 10 into two orthogonal components. It will also be seen that ideally, the scanning pattern employs four traces extending between the aperture and the masking electrode and disposed in quadrature so that the beam is caused to move into and out of the aperture alternately in two transverse directions.

It will be readily apparent that other scanning patterns are equally employable with my invention, such as that shown in FIG. 6. The scanning pattern shown in FIG. 6 is epicyclic in nature, having four loops 92 which extend into aperture 36. This may be generated by the functions:

$$y = A \sin wt + B \sin 5wt$$
$$x = A \cos wt + B \cos 5wt$$

where $B$ is at least equal to $A/5$.

I prefer a scanning pattern of the type shown in FIG. 6 since it results in a circular searching pattern rather than a cruciform searching pattern as provided with the scanning pattern of FIGS. 3 and 4.

It will be readily apparent that phase detectors or phase sensitive rectifiers 74, 76 which compare the fundamental scanning frequency of FIG. 5(A) with the error signals provided by the amplifier and filter channels 68 and 70 will provide a continuous indication of the respective vertical or "up-down" or horizontal "left-right" directional error on indicating instruments 94 and 96, which may be center reading voltmeters. It will be readily apparent that my improved radiant spot tracking system possesses the advantages of lack of vibration, light weight, and low power requirement as compared with prior systems known to the present applicant. It will further be readily apparent that the magnetic deflection system 12, shown and described, may be replaced by a conventional electrostatic deflection system.

While I have described above the principles of my invention in connection with specific apparatus, it is to be clearly understood that this description is made only by way of example and not as a limitation to the scope of my invention.

What is claimed is:

1. A system for tracking a radiant image comprising: an image tube having photocathode means for producing an electron image in response to impingement of a radiation image thereon, a masking electrode spaced from said photocathode means and having a relatively small aperture therein, means for focusing said electron image in an electron image plane which includes said aperture, an anode spaced from said masking electrode on the side thereof remote from said photocathode for receiving electron flow which passes through said aperture, output circuit means coupled to said anode for developing an output signal responsive to said electron flow, and means for deflecting said electron image in two transverse directions; sweep generator means coupled to said deflecting means for scanning said electron image over said masking electrode in a closed regular geometric pattern with a plurality of reentrant traces, said aperture being smaller than said geometric pattern whereby said electron image is caused to move into and out of said aperture to provide a digital output signal having a fundamental frequency component responsive to displacement of said geometric pattern from the center of said aperture and having a harmonic of said fundamental frequency component when said geometric pattern is in the center of said aperture; first filter means responsive to said harmonic of said fundamental frequency component when said electron image is in the center of said aperture and means responsive to said harmonic to indicate that said electron image is in the center of said aperture; means coupled to said output circuit means and to said sweep generator means for separating said output signal into two orthogonal component signals respectively and means responsive to the amplitude of said fundamental frequency component to cause said image tube to track said radiant image.

2. The combination of claim 1 further comprising second filter means coupled to said separating means for respectively deriving said fundamental frequency component from said orthogonal component signals.

3. The combination of claim 2 further comprising moving means exterior to said tube for moving said radiation image with respect to said photocathode thereby moving said electron image in its undeflected condition; and servo means respectively coupling said second filter means to said moving means whereby said radiation image is moved thereby to center said electron image in said aperture responsive to said displacement of said geometric pattern.

4. The combination of claim 1 wherein said sweep generator means scans said image to provide a pattern having four traces extending between said aperture and said masking electrode and disposed in quadrature.

5. The combination of claim 1 wherein said sweep generator means scans said image to provide a pattern in the general form of a four pointed star having its center within said aperture and its points falling on said masking electrode.

6. The combination of claim 1 wherein said sweep generator means scans said image in an epicyclic pattern having four internal loops in quadrature extending into said aperture.

7. A system for tracking a radiant spot on a relatively darker background comprising: an image tube having photocathode means for producing an electron beam in response to impingement of radiation from said radiant spot thereon, a masking electrode spaced from said photocathode means and having a relatively small aperture therein, means for focusing said electron beam in an electron image plane which includes said aperture, an anode spaced from said masking electrode on the side thereof remote from said cathode for receiving electron flow which passes through said aperture, output circuit means coupled to said anode for developing a digital output signal responsive to said electron flow, and vertical and horizontal deflection means for said beam disposed between said photocathode and said masking electrode, said photocathode having a center from which an electron beam in its undeflected condition would pass through said aperture; a source of alternating current having a fundamental frequency; vertical and horizontal sweep generator means coupled to said source and energized thereby and respectively coupled to said vertical and horizontal deflection means for scanning said beam over said masking electrode in a closed regular geometric pattern having four reentrant traces and disposed in quadrature, said aperture being smaller than said geometric pattern whereby said beam is caused to move into and out of said aperture so as to provide an output signal having a component at said fundamental frequency whose amplitude varies in proportion to the displacement of said radiant spot from the center of said photocathode and harmonics of said fundamental frequency when said radiant spot is at the center of said photocathode; first filter means coupled to the output circuit means of said image tube and responsive to said harmonics; means coupled to said first filter means to indicate said radiant spot is at the center of said photocathode when said harmonic output occurs; second and third filter means responsive to said fundamental frequency component; switching means alternately coupling said tube output signal to said second and third filter means and coupled to said sweep generator means and actuated thereby to gate the portions of said output signal responsive to movement of said beam in one quadrature axis into said second filter means and the portions responsive to beam movement in the other quadrature axis into said third filter means and means responsive to the amplitude of said fundamental frequency component to cause said image tube to track said radiant spot.

References Cited in the file of this patent
UNITED STATES PATENTS

| | | |
|---|---|---|
| 2,425,956 | Salinger | Aug. 19, 1947 |
| 2,796,547 | Nevin | June 18, 1957 |
| 2,892,949 | Hardy | June 30, 1959 |
| 2,966,591 | McCartney | Dec. 27, 1960 |
| 2,967,247 | Turck | Jan. 3, 1961 |